(12) United States Patent
Sakata et al.

(10) Patent No.: US 7,773,828 B2
(45) Date of Patent: Aug. 10, 2010

(54) METHOD AND DEVICE FOR STABILIZING AN IMAGE BY APPLYING AN AFFINE TRANSFORM BASED ON A WEIGHTED AVERAGE OF MOTION VECTORS

(75) Inventors: Seiichiro Sakata, Akiruno (JP); Kenichi Horie, Machida (JP)

(73) Assignee: Olympus Imaging Corp., Tokyo (JP)

( * ) Notice: Subject to any disclaimer, the term of this patent is extended or adjusted under 35 U.S.C. 154(b) by 658 days.

(21) Appl. No.: 11/320,454

(22) Filed: Dec. 28, 2005

(65) Prior Publication Data

US 2006/0153472 A1    Jul. 13, 2006

(30) Foreign Application Priority Data

Jan. 13, 2005   (JP)   ............... 2005-006771
Dec. 6, 2005    (JP)   ............... 2005-352376

(51) Int. Cl.
G06K 9/32    (2006.01)
G06K 9/40    (2006.01)
H04N 5/228   (2006.01)

(52) U.S. Cl. .............. 382/294; 382/255; 382/275; 348/208.99; 345/634

(58) Field of Classification Search ............... 382/275, 382/255, 293–296, 298; 348/208.99
See application file for complete search history.

(56) References Cited

U.S. PATENT DOCUMENTS

| | | | | |
|---|---|---|---|---|
| 5,469,274 A * | 11/1995 | Iwasaki et al. | ............. | 358/450 |
| 5,923,786 A * | 7/1999 | Murayama | ............. | 382/242 |
| 5,986,668 A * | 11/1999 | Szeliski et al. | ............. | 345/634 |
| 6,205,259 B1 * | 3/2001 | Komiya et al. | ............. | 382/284 |
| 6,597,816 B1 * | 7/2003 | Altunbasak et al. | ......... | 382/275 |
| 6,628,711 B1 * | 9/2003 | Mathew et al. | ......... | 375/240.12 |
| 2003/0012277 A1 * | 1/2003 | Azuma et al. | ........ | 375/240.08 |
| 2003/0090593 A1 * | 5/2003 | Xiong | ........ | 348/620 |
| 2004/0001147 A1 * | 1/2004 | Vella et al. | ............. | 348/208.99 |

FOREIGN PATENT DOCUMENTS

| | | |
|---|---|---|
| JP | 06-303490 | 10/1994 |
| JP | 09-037255 | 2/1997 |

(Continued)

OTHER PUBLICATIONS

Buzug, T.M., et al. (May 1999) "Weighted least squares for point-based registration in digital subtraction angiography (DSA)." SPIE vol. 3661, pp. 139-150.*

(Continued)

*Primary Examiner*—Brian P Werner
*Assistant Examiner*—Barry Drennan
(74) *Attorney, Agent, or Firm*—Straub & Pokotylo; John C. Pokotylo

(57) ABSTRACT

Target pixel blocks are picked up from a target image selected from a plurality of images picked up by an imaging device, motion vectors of these target pixel blocks are calculated between two images, and affine transformation coefficients for blur correction is calculated based on the motion vectors. Weighting coefficients are set for target pixel blocks based on a confidence level of the calculated motion vectors with respect to the image blur. For example, motion vectors in peripheral portion of the image is usually large in size, so that the confidence level of these may be enhanced.

8 Claims, 11 Drawing Sheets

FOREIGN PATENT DOCUMENTS

| | | |
|---|---|---|
| JP | 11-086003 | 3/1999 |
| JP | 2000-161913 | 6/2000 |
| JP | 2003-018604 | 1/2003 |

OTHER PUBLICATIONS

Vella, F., et al. (Jun. 2002) "Robust digital image stabilization algorithm using block motion vectors." Int'l Conf. on Consumer Electronics 2002, pp. 234-235.*

Rousso, B., et al. (Jun. 1996) "Robust recovery of camera rotation from three frames." IEEE Comp. Soc. Conf. on Computer Vision and Pattern Recognition, pp. 796-802.*

Chang, H-C., et al. (Jun. 2004) "A robust and efficient video stabilization algorithm." 2004 IEEE Int'l Conf. on Multimedia and Expo 2004, vol. 1 pp. 29-32.*

Shen, B., et al. (Sep. 1999) "Adaptive Motion-Vector Resampling for Compressed Video Downscaling." IEEE Trans. on Circuits and Systems for Video Technology, vol. 9 No. 6, pp. 929-936.*

Fisher, R., et al. (May 2004) "Image Processing Learning Resources." At http://homepages.inf.ed.ac.uk/rbf/HIPR2/rotate.htm .*

* cited by examiner

METHOD AND DEVICE FOR STABILIZING AN IMAGE BY APPLYING AN AFFINE TRANSFORM BASED ON A WEIGHTED AVERAGE OF MOTION VECTORS

CROSS-REFERENCE TO RELATED APPLICATION

This application is based upon and claims the benefit of priority from prior Japanese Patent Application Nos. 2005-006771, filed on Jan. 13, 2005; 2005-352376, filed on Dec. 6, 2005, the entire contents of which are incorporated herein by reference.

BACKGROUND OF THE INVENTION

1. Field of the Invention

The present invention relates to a blurring correction method for correcting image blur, and an imaging device that captures an object image and corrects blur of the captured image. More particularly, the invention relates to a blur correction method of movies and a video imaging device capable of correcting blur of video images.

2. Description of the Related Art

There has conventionally been known aligning devices that detect the misalignment caused by shifting and rotation between two images to align these images. The Japanese patent application published under JP A 11-86003 discloses such an aligning device. This device first divides a reference image into a plurality of pixel blocks for a block matching process, through which misalignments caused by a shift and a rotation between the reference image and a target image, which is to be aligned to the reference image, are detected. The detection results are used to align the two images with each other. Further, the aligning device calculates the variance of density distribution of each pixel block. If the obtained variance value for a pixel block is less than a predetermined threshold value, such a block will likely lead to erroneous matching results and is therefore discarded from the block matching process, in order to enhance the accuracy of alignment.

BRIEF SUMMARY OF THE INVENTION

According to the present invention, a blur correction method comprising: selecting a first image and a second image; selecting at least two blocks from the first image; calculating position vectors related to positions of the blocks and motion vectors indicative of relative motions of the blocks between the first and the second images; and correcting blur of the first image based on the motion vectors.

In the blurring correction utilizing the motion vectors, in this invention, the method at least further comprising: selecting weight coefficients for the blocks based on degrees of confidence of the motion vectors with respect to the blur; calculating coefficients of an affine transformation at least from the position vectors, the motion vectors, and the weight coefficients; and subjecting the first image to the affine transformation to correct the blur.

Since the degrees of confidence of the motion vectors are judged and coefficients for the blocks are weighted based on the degree of confidence, it is possible to detect and correct the image blur with high precision in response to various motions or states of the object or the object image.

In this invention, the weight coefficients can be selected based on the degrees of confidence corresponding to the positions of the blocks.

As the first image, we can use an image already divided into a plurality of areas, or we can divide an image into a plurality of areas in the process of the method. In such cases, the blocks can be selected from the areas such that none of the blocks protrudes from one of the areas.

The weight coefficients are selected based on the positions of the blocks.

For example, the weight coefficients can be selected in dependence of the areas, which areas comprise at least an inner area placed substantially in a center portion of the first image and at least an outer area placed in a peripheral portion of the first image. The weight coefficients for a first group of the blocks positioned in the inner area can be selected to be substantially smaller than the weight coefficients for a second group of the blocks positioned in the outer area because the amount of movement is larger in the outer area.

The weight coefficients can also be selected in relation with directions of the motion vectors, lengths of the motion vectors, a direction and/or a length of each of the motion vectors, and contrast values of the blocks.

When weight coefficients are selected based on the positions of the blocks, at least one and/or some part of the weight coefficients can be selected in response to a degree of divergence of at least one of the motion vectors of at least one of the blocks, wherein the degree of divergence is indicative of how much other motion vectors of an area in a vicinity of the one block diverges in direction with respect to the one motion vector. Further, the weight coefficients can be selected in response to the positions of the blocks.

The affine transformation can comprise a rotation. The rotational angle can be expressed as a combination of at least following expressions: the weight coefficients; a relative position vector as a difference of one of the position vectors with a center-of-gravity position vector; a relative motion vector as a difference of one of the motion vectors with a center-of-gravity motion vector. The center-of-gravity position vector is indicative of a weighted center of gravity of the position vectors weighted in relation with the weight coefficients, and the center-of-gravity motion vector is indicative of a weighted center of gravity of the motion vectors weighted in relation with the weight coefficients.

The rotational angle can be expressed as or as an ARCTANGENT of a ratio between a numerator and a denominator, wherein the numerator comprises a weighted sum of numerator terms, each of the numerator terms being a product of a weight coefficient and an inner product of a relative position vector with an orthogonally rotated relative motion vector; and the denominator comprises a weighted sum of denominator terms, each of the denominator terms being a product of a weight coefficient and an inner product of a relative position vector with an expression comprising a relative motion vector.

The affine transformation can further comprise a shift transformation portion, which is composed of at least the center-of-gravity position vector and the center-of-gravity motion vector. In this case the blur correction method can be characterized in that rotating the first image by an amount given by the rotational angle; and shifting the first image by a vector amount given by the shift transformation portion.

The blocks and the weight coefficients can be selected such that the center-of-gravity position vector becomes essentially a zero vector.

For example, the method can further comprising: rotating the first image around a position indicated by the center-of-gravity position vector by an amount given by the rotational angle; and shifting the first image by a shifting vector amount derived from the center-of-gravity motion vector. In this case, the selected block can comprise a first block and a second block both of which are taken from two different corner areas of the first image, under the conditions: the center-of-gravity position vector points at the first block; the weight coefficient of the second block is selected to be significantly smaller than that of the second block; and the relative motion vector is given by a difference of the motion vectors of the first and the second blocks.

Returning to the basic idea of this invention, the first and the second images can be selected from a plurality of frames of a moving image, and the blocks and the motion vectors can be related to those processed in a coding process of the moving image. The degrees of confidence can be related with a calculation precision of the coefficients of the affine transformation.

This invention can also be expressed more specific way as the blur correction method comprising, selecting a first and a second image; selecting at least two blocks from the first image; calculating motion vectors indicative of relative motions of the blocks between the first and the second images; selecting weight coefficients for the blocks related with at least one of the positions of the blocks, contrast values of image contents of the blocks, magnitudes of the motion vectors, and directions of the motion vectors; calculating coefficients of an affine transformation from position vectors related to positions of the blocks, the motion vectors, and the weight coefficients; and applying the affine transformation to correct a blur between the first image and the second image.

As another way to express this invention, a blur correction method comprising, selecting a first and a second image; selecting a first and a second block from the first image; calculating a rotational angle of a rotation and a shift vector of an affine transformation to correct the blur between the first and the second images, wherein the rotational angle is expressible based upon a first expression and a second expression; the first expression comprises an inner product of a second position vector of the second block and an orthogonally rotated vector of a difference vector between a first motion vector of the first block and a second motion vector of the second block; the second expression comprises an inner product of the second position vector and a vector expression comprising the second position vector and the difference vector; and the shift vector comprises the first motion vector.

This invention can be understood as an imaging device capable of performing the method.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Figure 1:
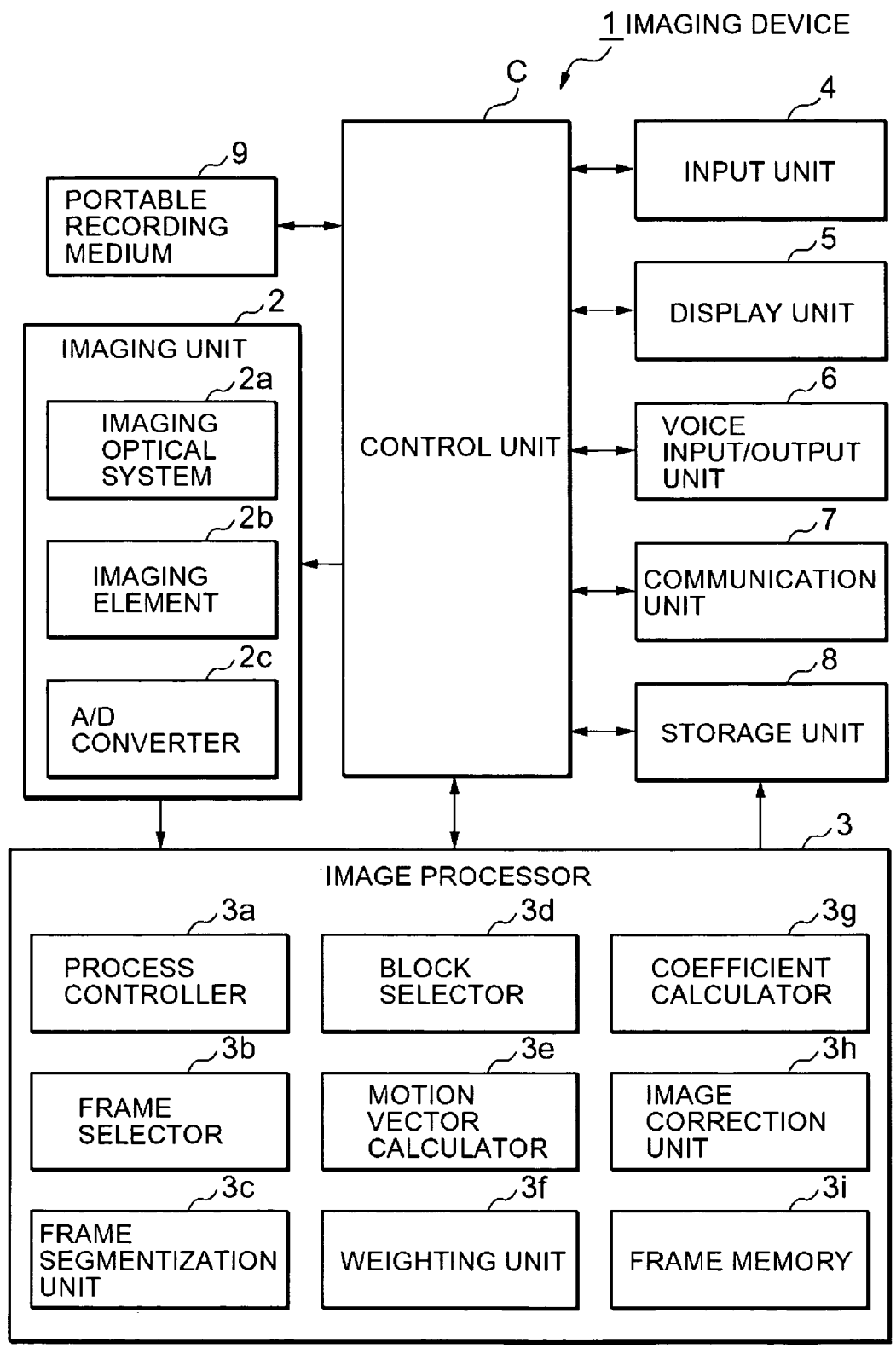
FIG. 1 is a block diagram showing a configuration of an imaging device according to Embodiment 1 of the present invention.

Preferred embodiments of the invention are described below with reference to the accompanying drawings.

The embodiment is in no way limitative of the present invention. Similar portions are denoted by similar reference numerals throughout the drawings.

Embodiment 1

Figure 2:
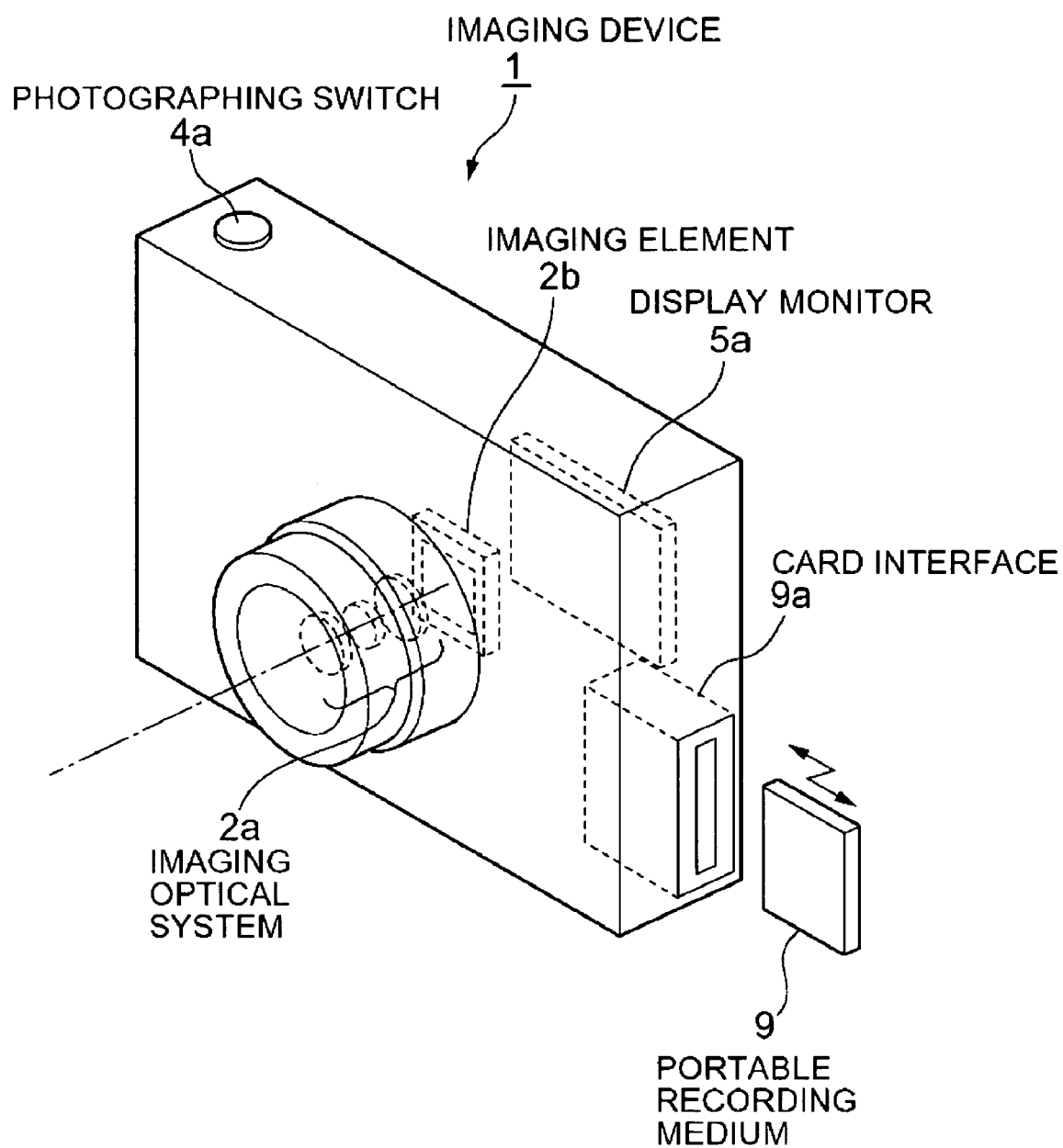
FIG. 2 is a perspective diagram showing an outline of the configuration of the imaging device according to the Embodiment 1 of the present invention.

First, an imaging device according to Embodiment 1 of the present invention will be described. FIG. 1 is a block diagram showing the configuration of the imaging device of the Embodiment 1. FIG. 2 is a perspective diagram showing an outline of the imaging device of the Embodiment 1.

As shown in FIG. 1, the imaging device 1 of the Embodiment 1 includes an imaging unit 2, an image processor 3, an input unit 4, a display unit 5, a voice input/output unit 6, a communication unit 7, a storage unit 8, a portable recording medium 9, and a control unit C.

The imaging unit 2 images an object to generate an image signal. The image processor 3 processes the image signal generated by the imaging unit 2. The input unit 4 receives various pieces of instruction information. The display unit 5 displays various pieces of information. The voice input/output unit 6 inputs/outputs voice information. The communication unit 7 communicates information with an external device. The storage unit 8 stores various pieces of information. The portable recording medium 9 can be used to transfer data to and from external devices. The control unit C controls the entire processing and operation of the imaging device 1. The imaging unit 2, the image processor 3, the input unit 4, the display unit 5, the voice input/output unit 6, the communication unit 7, the storage unit 8, and the portable recording medium 9 are electrically connected to the control unit C, and the control unit C controls these components.

The imaging unit 2 includes an imaging optical system 2a, an imaging element 2b, and an A/D converter 2c. The imaging optical system 2a focuses light from an object on the imaging element 2b. The imaging element 2b as imaging means is realized by a solid-state imaging device such as a CCD or a CMOS device. The imaging element 2b detects the light focused by the imaging optical system 2a as an optical signal corresponding to the object image, and converts the picked-up image into an analog electric signal and outputs it into the A/D converter 2c. The A/D converter converts this analog signal into a digital signal and passes it to the image processor 3. The imaging optical system 2a is realized by a zoom lens with variable focus length, and configured by combining a plurality of lenses, for example, as shown in FIG. 2. The imaging optical system 2a changes the focal distance or focuses an image to be picked up by moving a portion or all of the lenses along an optical axis direction by driving devices (not shown) under control of the control unit C. The imaging optical system 2a may be a single focus lens having a fixed focal distance, or may be detachably attached to the casing to be replaced by another imaging optical system.

The image processor 3 includes a process controller 3a, a frame selector 3b, a frame segmentization unit 3c, a block selector 3d, a motion vector calculator 3e, a weighting unit 3f, a coefficient calculator 3g, an image correction unit 3h, and a frame memory 3i.

The process controller 3a controls various image processing operations for the image data obtained from the imaging unit 2. The frame selector 3b selects a target image, which becomes the target of image blur correction, and a reference image, which serves as a reference for this correction, from the image signal obtained from the imaging unit 2. The frame segmentization unit 3c divides the selected target image into a plurality of pixel areas. The block selector 3d selects at least two target pixel blocks which do not include boundaries of the divided pixel areas and do not protrude from the pixel areas. The motion vector calculator 3e calculates a motion vector indicating the shift amount from the position on the reference image corresponding to the selected target pixel block to the position of this target pixel block. The weighting unit 3f selects a weighting factor indicating a weight of each selected target pixel block based on the confidence level of the calculated motion vector with respect to the blur of the target image. The coefficient calculator 3g calculates the coefficients of an affine transformation on the target image based on the position vector of each target pixel block with a predetermined coordinate origin set as a reference. The motion vectors are calculated by the motion vector calculator 3e, and the weighting factors are selected by the weighting unit 3f. Based on these coefficients, the image correction unit 3h subjects the target image to this affine transformation to correct the blur thereof. The frame memory 3i temporarily stores image information.

Each of these components disposed in the image processor 3 processes image data in accordance with instructions from the process controller 3a based on an instruction from the control unit C, and properly outputs image information like processing result, blurring correction information, calculation result or the like to the control unit C or the storage unit 8. The image processor 3 may subject the acquired image data to various image processing operations such as γ correction, Y/C separation (luminance signal/color signal separation), and color conversion.

The input unit 4 receives inputs of instruction information for various processing and operations to be executed by the imaging device 1 from the outside, and outputs the input instruction information to the control unit C. The instruction information received by the input unit 4 includes, for example, a start/end of the imaging device 1, a start/end of photographing, focusing of the imaging optical system 2a, setting of zoom position, setting of photographing mode, setting of a processing method of the image signal, and the like. The input unit 4 is realized by various switches of button and toggle types, input keys or a touch panel. For example, in FIG. 2 is shown a photographing switch 4a as an example of the input unit 4, which instructs a start/end of photographing.

The display unit 5 includes a display which may be, e.g., a liquid crystal display, an organic electroluminescence (EL) display, or displays employing LEDs, and displays various pieces of information based on an instruction from the control unit C. As information displayed by the display unit 4, there are image information generated by imaging of the imaging unit 2, image information processed by the image processor 3, announcement information to announce starts or completions of various processing and operations controlled by the control unit C, error information to announce errors generated in various processing and operations, and the like. For example, as shown in FIG. 2, the display unit 5 includes a display monitor 5a realized by a liquid crystal display on the backside of the imaging device 1, and displays images picked up by the imaging device 1 almost in real time. The display monitor 5a may display various pieces of information such as images stored in the storage unit 8.

The voice input/output unit 6 is realized by a microphone, a speaker or the like. Upon reception of voice information from the outside, the voice input/output unit 6 outputs the input voice information to the control unit C, and voice information input from the control unit C to the outside. As information input/output by the voice input/output unit 6, there is voice information accompanying a video captured by the imaging unit 2, or the like. The voice input/output unit 6 may output a predetermined announcement sound to announce a start or completion of processing executed by each component, or a predetermined warning sound to announce errors generated in various processing and operations.

The communication unit 7 is realized by using an external communication interface such as RS232C, USB, or IEEE1394, or an infrared data communication compliant with IrDA Standard. The communication unit 7 communicates various pieces of information such as image information or voice information with an external device based on an instruction from the control unit C.

For example, the storage unit 8 is realized by using a ROM in which various data such as programs for starting a predetermined OS and processing programs are pre-stored, and a RAM in which various processing parameters for processing and various pieces of information input/output to each component are stored. As information stored in the storage unit 8, there are image information picked up by the imaging unit 2, image information processed by the image processing unit 3, correction information, calculation results, calculation parameters used by the image processor 3, voice information accompanying video image captured by the imaging unit 2, various pieces of setting information of the imaging device 1, and the like.

The portable recording medium 9 may be a flash memory such as s smart media (registered trademark) which is a non-volatile memory, an optical recording medium such as a digital versatile disk (DVD). For example, as shown in FIG. 2, the portable recording medium 9 is detachably connected through a card interface 9a to the imaging device 1. When it is inserted into the imaging device 1, various pieces of information such as image data can be output or recorded. Information is output/recorded in the portable recording medium based on instructions from the control unit C.

The control unit C is realized by a CPU or the like to execute processing programs stored in the storage medium 8, and controls each component of the imaging device 1. Especially, the control unit C causes the process controller 3a to process blur correction, the display unit 5 to display the corrected image information, and the storage unit 8 to store the image information. The control unit C outputs image information imaged by the imaging unit 2 to the outside by the communication unit 7, or records it in the potable recording medium 9. The control unit C may output image information which is a processing result of the image processor 3 to the outside.

Figure 3A:
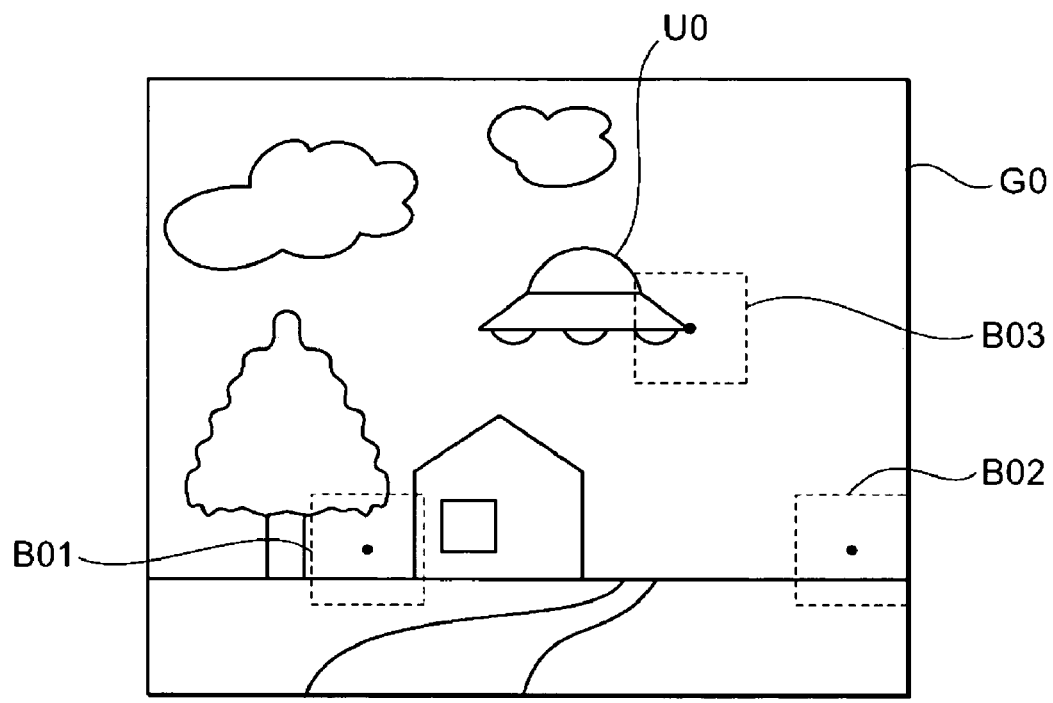
FIG. 3A is a schematic diagram showing a reference image which is a part of a moving image picked up by the imaging device shown in FIG. 1.
Figure 3B:
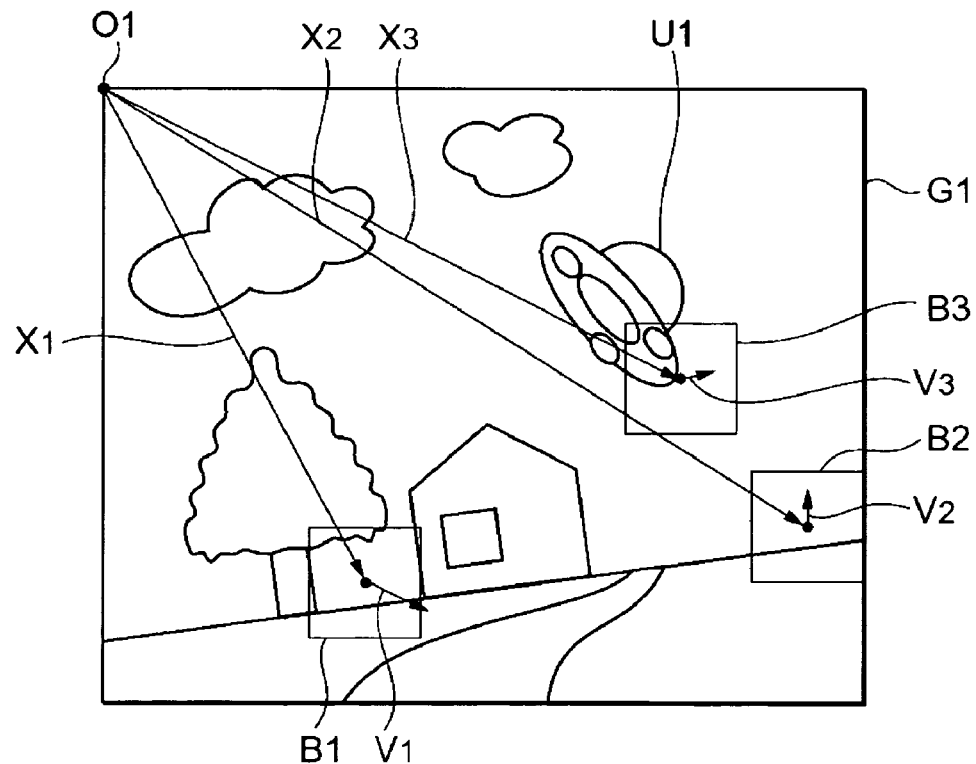
FIG. 3B is a schematic diagram showing a target image which is a part of the moving image picked up by the imaging device shown in FIG. 1.

Next, blur correction of an image executed by the image processor 3 will be described. FIGS. 3A and 3B show portions of a movie captured by the imaging device 1, showing an example of a reference image serving as a reference for correcting image blur, and a target image upon which blur correction will be applied. As shown in FIGS. 3A and 3B, the target image G1 shows a blur when compared with the reference image G0, which has been caused by a movement of the imaging device 1 during photographing. Such image blur (misalignment between images) can be generally represented by an affine transformation. Conversely, image blur can be corrected by subjecting the target image G1 to an affine transformation. An affine transformation is a transformation of graphics and images based on a combination of a linear transformation such as rotation with a parallel movement (shift transformation), and is generally represented by the following equation (1):

$$X' = T \cdot X + S \tag{1}$$

Here, X and X' denote position vectors corresponding to an arbitrary point of the graphics before and after affine transformation, respectively, T is a transformation matrix representing the linear transformation portion of the affine transformation, and S is a vector representing the shift transformation portion of the affine transformation. However, in the case of image blur caused by a shift and/or a rotation, as shown in FIG. 3B, the linear transformation matrix T can be replaced by a rotation matrix $R(\phi)$ representing a counterclockwise rotation with rotation angle $\phi$. Certain objects of the target image G1 and the reference image G0 are changed in position and orientation separately from image blur as indicated by the relation between the object image U0 of the reference image G0 and the object image U1 of the target image G1. These changes are not corrected by the affine transformation.

As shown in FIG. 3B, the image processor 3 selects, for example, target pixel blocks B1 to B3 from the target image G1, and calculates motion vectors $V_1$ to $V_3$ of these blocks B1 to B3 by block matching process. Then, the image processor 3 calculates the transformation coefficients of affine transformation corresponding to blur of the target image G1 based on the calculated motion vectors $V_1$ to $V_3$, weighting factors $w_1$ to $w_3$ of the target pixel blocks B1 to B3 set based on confidence level of the motion vectors with respect to image blur, and position vectors $X_1$ to $X_3$ pointing at respective center positions of the target pixel blocks B1 to B3. Further, the image processor 3 subjects the target image G1 to affine transformation based on the calculated transformation coefficients to correct image blur.

The block matching process is employed to obtain parallel shift amounts and directions, with respect to the reference image G0, of the selected target image blocks B1 to B3. Specifically, pixel blocks B01, B02, and B03 that best match the target pixel blocks B1 to B3, respectively, are detected on the reference image G0, and motion vectors $V_1$ to $V_3$ indicating movements from center positions of the so detected pixel blocks B01, B02, and B03 to the center positions of the corresponding target image blocks B1 to B3, respectively, are obtained. In general, a matching degree between pixel blocks can be evaluated by using the sum of absolute values of differences of pixel values between the pixel blocks. Other possibilities are to take absolute values of differences of average pixel values, absolute values of differences of standard deviations of pixel values, correlation functions of pixel values, or Fourier coefficients of pixel values, for example. The coordinate origin serving as the reference for the position vectors $X_1$ to $X_3$ is indicated by the point O1 in the left corner of the target image G1 in FIG. 3B. However of course, points other than O1, inside or outside the target image G1, may be chosen as well.

The image processor 3 calculates the transformation coefficients of the affine transformation to correct the target image G1 based on the least square method. The image processor calculates the rotation matrix $R(\phi)$ and the shift vector S which minimize the evaluation function F represented by the following equation (2).

$$F = \sum_{i}^{n} w_i \{(R(\phi) \cdot X_i + S) - (X_i - V_i)\}^2 \tag{2}$$

Here the position vectors, motion vectors, and weighting factors corresponding to the target pixel blocks Bi (i=1, 2, ..., n) are respectively $X_i$ (i=1, 2, ..., n), Vi (i=1, 2, ..., n), and $w_i$ (i=1, 2, ..., n) whereby the number of target pixel blocks selected from the target image G1 has been set to n, thereby generalizing the equation. In equation (2), the motion vector Vi represents the movement of the block Bi with respect to the reference image G0, so that the expression $(X_i - V_i)$ represents the position of this block when it is corrected in a strict sense. On the other hand, the other expression $(R(\phi) \cdot X_i + S)$ points at the position assumed when correcting the position vector $X_i$ using an affine transformation. Therefore, by taking the $w_i$-weighted sum of squares of the absolute values of the differences between $(X_i - Vi)$ and $(R(\phi) \cdot X_i + S)$ as the evaluation function, and by taking $R(\phi)$ and S realizing a minimum value of F, such a choice of $R(\phi)$ and S will realize the best blur correction in the sense of least square method. An alignment method based on a weighted least square method is disclosed, for example, in the Japanese Patent Application Laid-Open No. JP 2000-161913.

When the value of the evaluation function F becomes a minimum, the respective rotation matrix $R(\phi)$ and the shift vector S satisfy the following conditions (3) and (4), from which they can be respectively calculated by equations (5) and (6):

$$\frac{\partial F}{\partial S} = 2\sum_{i}^{n} w_i \{R(\phi) \cdot X_i + S - X_i + V_i\} = 0 \tag{3}$$

$$\frac{\partial F}{\partial \phi} = 2\sum_{i}^{n} w_i \{R(\phi) \cdot X_i + S - X_i + V_i\} \cdot \left\{\frac{\partial R(\phi)}{\partial \phi} \cdot X_i\right\} = 0 \tag{4}$$

$$S = X_c - V_c - R(\phi) \cdot X_c \tag{5}$$

$$\phi = \arctan \frac{\sum_{i=1}^{n} w_i (X_i - X_c) \cdot (-V_i + V_c)^{\#}}{\sum_{i=1}^{n} w_i (X_i - X_c) \cdot \{(X_i - X_c) + (-V_i + V_c)\}} \tag{6}$$

Here, # indicates counterclockwise rotation by 90°. Further, w is a sum of weighting factors $w_i$, and $X_c$ is the position vector for the center of gravity, which is in fact a weighted center of gravity of position vectors $X_i$, as defined in equation (7). Likewise, $V_c$ is a motion vector lying at the center of gravity (again, weighted center of gravity) of the motion vectors $V_i$, as defined in equation (8).

$$X_c = (w_1 \cdot X_1 + w_2 \cdot X_2 + \ldots + W_n \cdot X_n)/w \quad (7)$$

$$V_c = (w_1 \cdot V_1 + w_2 \cdot V_2 + \ldots + w_n \cdot V_n)/w \quad (8)$$

The rotation matrix $R(\phi)$ is represented by the following equation (9):

$$R(\phi) = \begin{pmatrix} \cos\phi & -\sin\phi \\ \sin\phi & \cos\phi \end{pmatrix} \quad (9)$$

When it is known beforehand that the rotational angle $\phi$ is small, or when the size of each motion vector $V_i$ is small, the rotational angle $\phi$ may be calculated by the following equation (10) similar to the equation (6). Accordingly, the image processor 3 can achieve a high speed for calculation processing to obtain the rotation matrix $R(\phi)$:

$$\phi = \frac{\sum_{i=1}^{n} w_i (X_i - X_c) \cdot (-V_i + V_c)^{\#}}{\sum_{i=1}^{n} w_i (X_i - X_c) \cdot \{(X_i - X_c) + (-V_i + V_c)\}} \quad (10)$$

Based on the rotation matrix $R(\phi)$ and the shift vector S thus obtained, the image processor 3 applies the affine transformation on the target image G1, as shown in the following equation (11), to correct the image blur:

$$X' = R(\phi) \cdot X + \{X_c - V_c - R(\phi) \cdot X_c\} \quad (11)$$

In this affine transformation, the image processor 3 rotates the target image G1 counterclockwise by a rotation angle $\phi$ around the coordinate origin O1, and shifts this rotated target image G1 by a shift vector $S = X_c - V_c - R(\phi) \cdot X_c$.

The equation (11) can be changed to the following equation (12):

$$X' = (R(\phi) \cdot (X - X_c) + X_c) - V_c \quad (12)$$

That is, the affine transformation shown in the equation (11) can be replaced with a transformation in which, as shown in the equation (12), the target image G1 is rotated counterclockwise by the rotational angle $\phi$ centering on the weighted center of gravity of the position vectors Xi, indicated by the respective position vector Xc, and the rotated target image G1 is shifted by the vector $-V_c$. In this case, the calculation performed by the image processor 3 can be simplified as compared with the calculation of the affine transformation shown in the equation (11), and processing loads on the image processor 3 can be reduced to enhance the processing speed.

Figure 4:
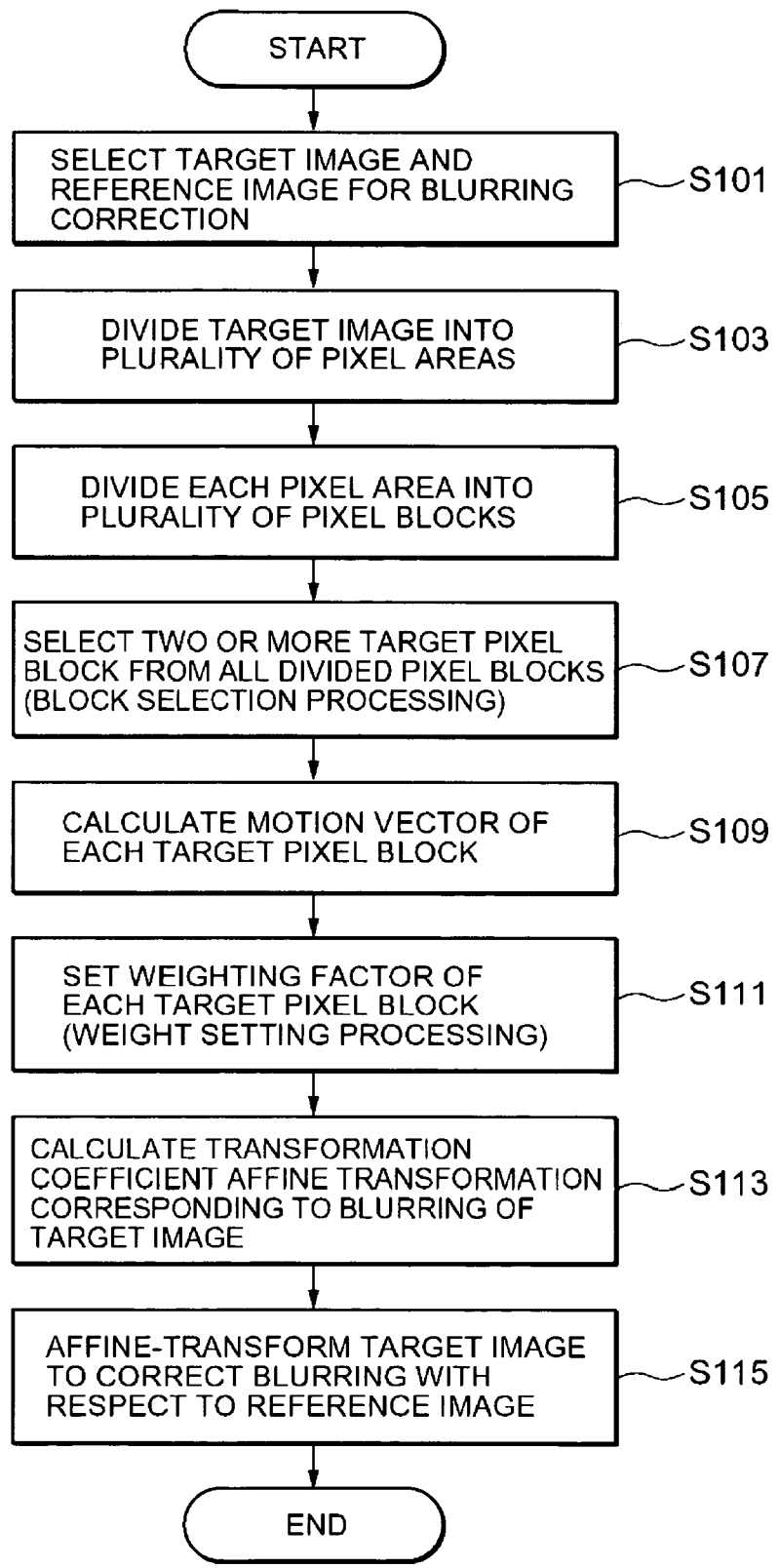
FIG. 4 is a flowchart showing a correction processing procedure of image blur carried out by an image processor shown in FIG. 1.

The blur correction process performed by the image processor 3 will be explained with reference to FIG. 4. FIG. 4 is a flowchart showing the correction process of the image blur under control of the process controller 3a. It is to be noted that the flowchart shown in FIG. 4 illustrates the process of the blur correction with respect to one target image. When the blur of moving image is to be corrected, this process should be continuously repeated.

As shown in FIG. 4, under the control of the process controller 3a, the frame selector 3b selects a target image Gt and a reference image G0 for the blur correction from the image information acquired by the imaging unit 2 (step S101). The frame segmentization unit 3c divides the selected target image Gt into a plurality of pixel areas As (s=1, 2, . . . , h; h being the number of divisions) (step S103). The block selector 3d divides each divided pixel area As into a plurality of pixel blocks (step S105). Furthermore, the block selector 3d performs a block selection processing to select at least two pixel blocks as target pixel blocks Bi from all of the divided pixel blocks (step S107). Moreover, the motion vector calculator 3e calculates the motion vector Vi of each target pixel block Bi by performing block matching processing (step S109). The weighting unit 3f performs weight selection process to set a weighting factor wi of each target pixel block Bi based on the confidence level of each calculated motion vector Vi with respect to the blur of the image (step S111). Thereafter, the coefficient calculator 3g calculates the transformation coefficients of the affine transformation for correcting the target image Gt (step S113). The image correction unit 3h subjects the target image Gt to the affine transformation based on the calculated transformation coefficients to correct the blurring with respect to the reference image Go (step S115), thereby ending a series of blur correction processing.

Figure 5:
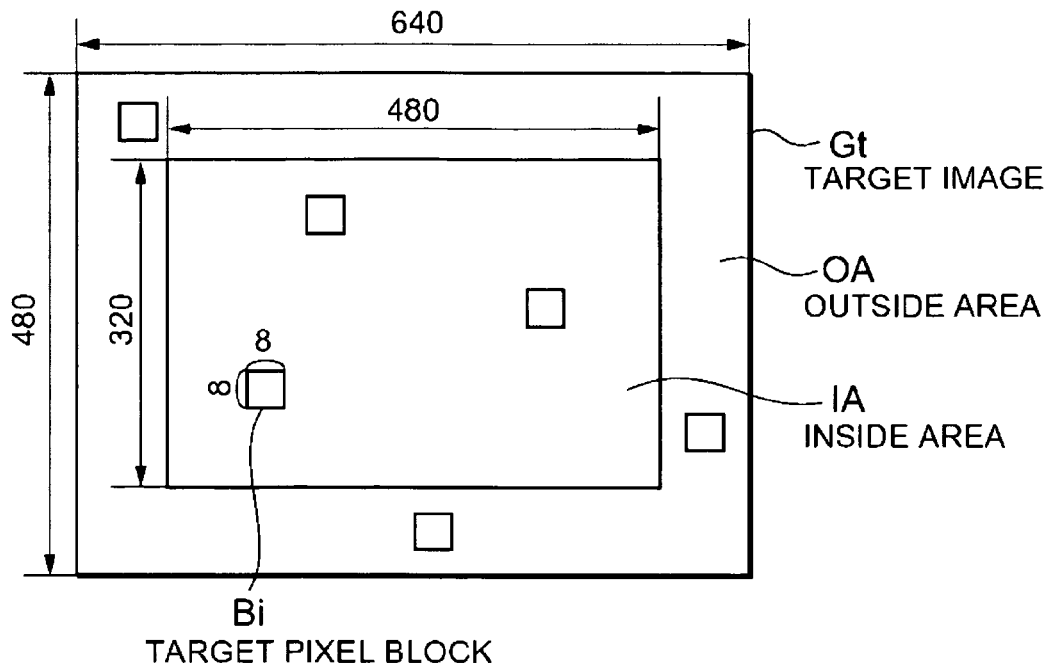
FIG. 5 is a schematic diagram showing an example of pixel areas into which a target image is divided and target pixel blocks.

Here, in step S103, for example, as shown in FIG. 5, the frame segmentization unit 3c divides the target image Gt into two pixel areas As: an inside area IA disposed in the center of the target image Gt; and an outside area OA in a peripheral portion of the target image Gt. FIG. 5 specifically shows a case where resolution is of a video graphics array (VGA), and the target image Gt is set to 640×480 pixels whereas the inside area IA is set to 480×320 pixels. It is to be noted that the frame segmentization unit 3c may divide the target image Gt into more areas. For example, the entire target image Gt may be divided into pixel areas each having 16×16 pixels. In this case, the target image Gt is divided into 40×30 pixel areas. The resolution of the target image Gt is not limited to VGA, and may be an arbitrary resolution such as an extended graphics array (XGA).

In step S105, the block selector 3d divides the target image Gt into pixel blocks of 8×8 pixels each, so that the entire target image Gt is divided into 80×60 pixel blocks, and the inside area IA is divided into 60×40 pixel blocks. Here, the pixel block of 8×8 pixels has a size and a shape which are equal to those of the pixel block which is a processing target of interframe prediction processing generally performed during compression coding of moving image. By employing the same pixel blocks to be divided in different processes, the motion vector of each pixel block calculated during the interframe prediction processing can be used in the blur correction process of Embodiment 1, for example. This simplifies the whole processing and leads to an increase in the processing speed. It is to be noted that the frame segmentization unit 3c divides the image into the pixel areas As such that each area has length and width which are integer multiples of those of the pixel blocks in consideration, namely 8×8 pixels.

In step S107, as shown in FIG. 5, the block selector 3d selects a plurality of target pixel blocks Bi from each of the pixel areas IA and OA. Moreover, in step S111, the weighting unit 3f sets a weighting factor $w_i$ to each target pixel block Bi depending on the pixel areas As including the target pixel block Bi. The weighting unit 3f sets the weighting factor $w_i$ of the target pixel block Bi in such a way that for a pixel block positioned in the peripheral portion of the target image Gt the factor is larger than that of a target pixel block Bi positioned near the center of the target image Gt. That is, as to the plurality of target pixel blocks Bi shown in FIG. 5, the weighting unit 3f sets the weighting factor $w_i$ of the target pixel block Bi positioned in the outside area OA to be larger than that of the target pixel block Bi positioned in the inside area IA.

Usually, as to the image blur which involves rotation, the image largely blurs in the peripheral portion of the target image Gt. Therefore, the motion vector $V_i$ of a target pixel block Bi positioned in the outside area OA is a large vector, and can be calculated with high precision. On the other hand, the blurring due to the rotation of the center of the target image Gt is small, so that the motion vector $V_i$ of the target pixel block Bi positioned in the inside area IA is small. In general, an object of shooting is concentrated in the center of the target image Gt in many cases. Since the motion vector $V_i$ easily changes with the movement of the object which may be different from the blur of the image in its center area, the calculation precision of the motion vector $V_i$ of the target pixel block Bi positioned in the inside area IA decreases. Therefore, the confidence level of the motion vector $V_i$ with respect to the blur of the target image Gt is judged to be high in the outside area OA, and low in the inside area IA. Accordingly, the weighting factor $w_i$ of the target pixel block Bi positioned in the outside area OA is set to be larger than that of the target pixel block Bi positioned in the inside area IA.

As described above, the weighting unit 3f sets the weighting factor $w_i$ of each target pixel block Bi depending on the pixel area As. Consequently, in the imaging device 1 of Embodiment 1, influences of the object movement can be reduced, which are not related to the image blur, and the rotation matrix $R(\phi)$ and the shift vector S, which are the transformation coefficients of the affine transformation, can be calculated with high precision to enable precise correction of the blur. It is to be noted that, as for the plurality of target pixel blocks Bi positioned within the same pixel area As, the weighting unit 3f may judge the confidence level with respect to the image blur in setting the weighting factors $w_i$ depending on the position of each target pixel block Bi. In this way, the coefficient calculator 3g can calculate the rotation matrix $R(\phi)$ and the shift vector S more accurately.

Let us note that the pixel block to be divided by the block selector 3d is not limited to 8×8 pixels, but may be a pixel block having an arbitrary size such as 16×16 pixels. There is no limitation on the target pixel blocks Bi to be selected by the block selector 3d, as long as the block does not protrude from each pixel area As. The pixel block may be one of the pixel areas As itself. Furthermore, the target pixel blocks Bi may have individually different sizes and shapes. It is further to be noted that the block selector 3d does not have to select the target pixel blocks Bi from all of the pixel areas As, and may select the blocks from, for example, only one pixel area As.

Figure 6:
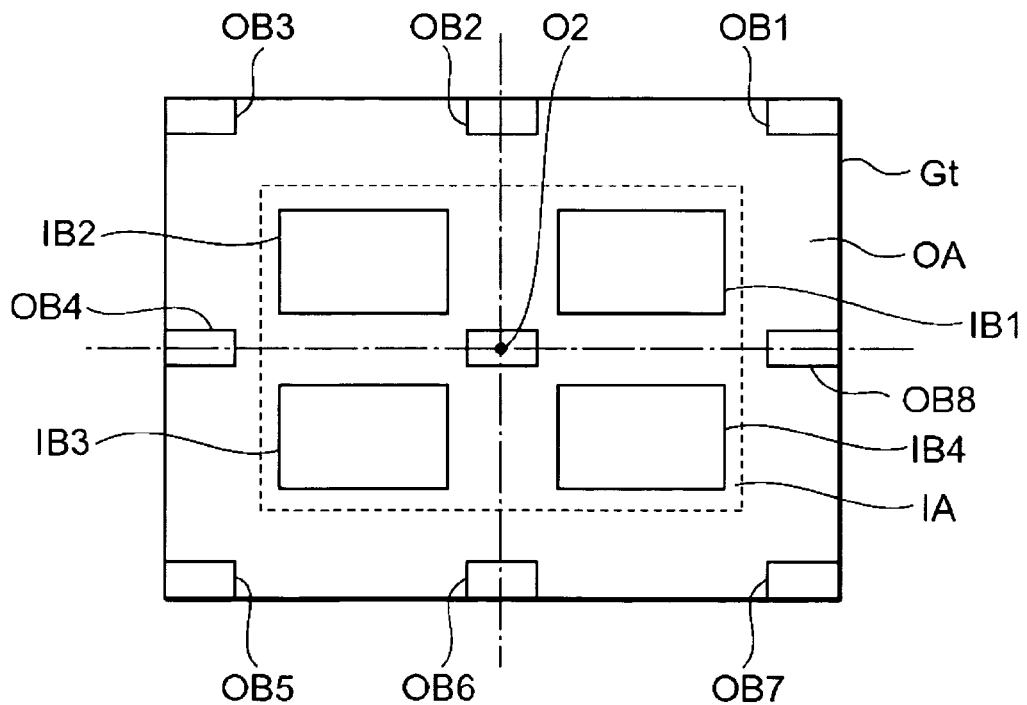
FIG. 6 is a schematic diagram showing another example of pixel areas into which a target image is divided and target pixel blocks.

FIG. 6 shows yet another example of the target pixel block Bi to be selected by the block selector 3d. As shown in FIG. 6, the block selector 3d selects comparatively large target pixel blocks $IB_1$ to $IB_4$ as the target pixel blocks Bi from the inside area IA, and selects comparatively small target pixel blocks $OB_1$ to $OB_8$ from the outside area OA. This is done for a reason similar to the one given above, namely that the weighting unit 3f sets the weighting factors $w_i$ of target pixel blocks Bi positioned in the outside area OA to be larger than that of the target pixel blocks Bi positioned in the inside area IA. That is, the motion vectors of the target pixel blocks $OB_1$ to $OB_8$ are large vectors. Therefore, even if the sizes of the target pixel blocks $OB_1$ to $OB_8$ are reduced, it is possible to calculate the motion vectors with high precision. When the size is reduced, calculation processing loads are reduced, and the processing speed can be enhanced. On the other hand, since the calculation precisions of the motion vectors of the target pixel blocks $IB_1$ to $IB_4$ are rather low, the sizes of the target pixel blocks $IB_1$ to $IB_4$ to be selected are enlarged in order to enable calculation of motion vectors averaged over large areas.

It is to be noted that the target pixel blocks $IB_1$ to $IB_4$ and $OB_1$ to $OB_8$ are selected so that they are positioned symmetrically with each other with respect to longitudinal and lateral center lines passing through the center point O2 of the target image Gt. If the target pixel blocks are symmetrically selected in this manner, and, for example, the weighting unit 3f selects uniform weighting factors $w_i$ to those target pixel blocks Bi disposed within the same pixel area As, the vector $X_c$ representing the weighted center of gravity of position vectors $X_i$ can be selected to be the center point O2. In this case, when the coordinate origin with respect to the target image Gt is set to the center point O2, the position vector $X_c$ of the center of gravity can be made a zero vector, and the calculation of the affine transformation shown in the equation (12) simplifies as shown by the next equation (13). Consequently, the processing loads on the image processor 3 can be further reduced, and the processing speed enhanced accordingly.

$$X'=R(\phi) \cdot X - V_c \qquad (13).$$

Moreover, the inside area IA, the outside area OA, the target pixel blocks $IB_1$ to $IB_4$, and the target pixel blocks $OB_1$ to $OB_8$ are all formed of rectangular areas as shown in FIG. 6, but may take arbitrary shapes instead. Furthermore, the pixel area As and the target pixel block Bi may be predetermined areas set beforehand, arbitrarily selected depending on the target image Gt, or selected in accordance with various characteristic values of the target image Gt.

Figure 7:
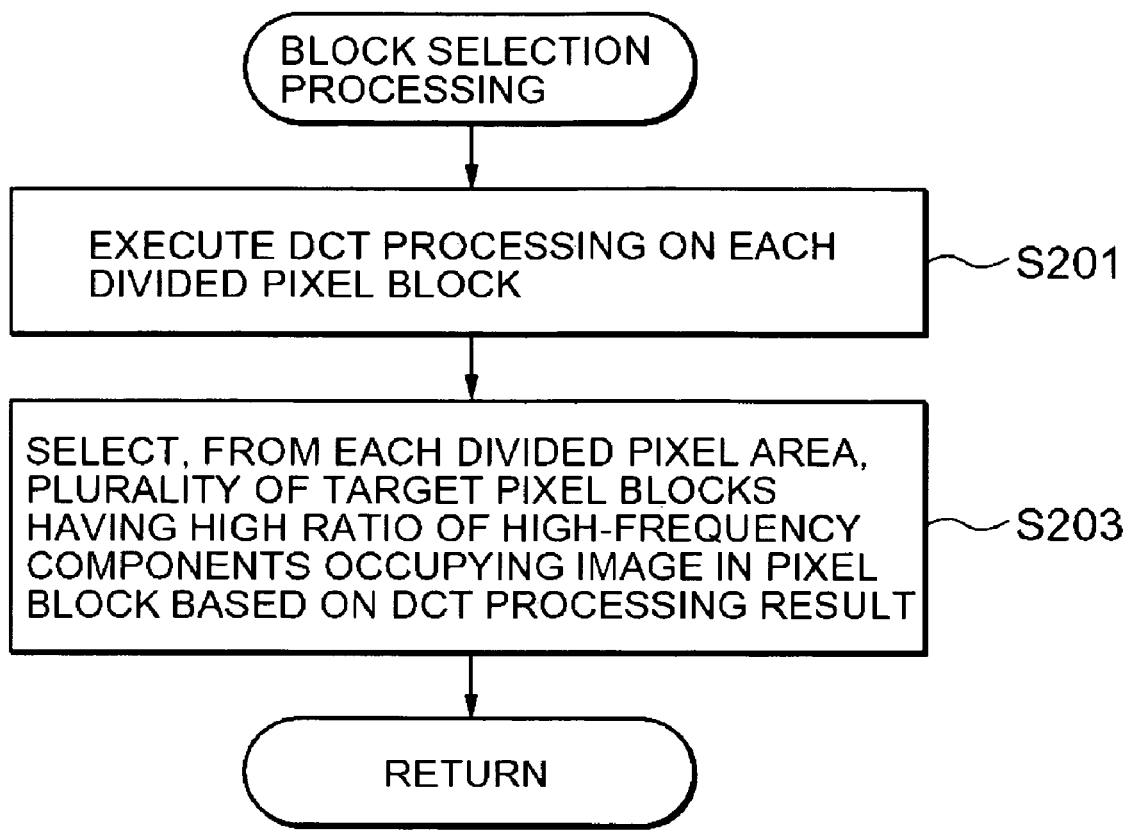
FIG. 7 is a flowchart showing a processing procedure for selecting a target pixel block having a high ratio of a high-frequency component in an image.

In a yet another example of weighting factor selection, the block selector 3d selects the target pixel block Bi in response to the characteristics of the target image Gt. FIG. 7 is a flowchart showing a processing procedure of a sub-routine of the block selection processing of step S107 shown in FIG. 4. As shown in FIG. 7, in this block selection processing, the block selector 3d performs discrete cosine transform (DCT) with respect to each pixel block divided in step S105 under the control of the process controller 3a (step S201). Based on this DCT processing result, the block selector 3d selects a plurality of pixel blocks having high proportions of high-frequency components as the target pixel blocks Bi from each pixel area As divided in step S103 (step S203), and the processing returns to the step S107. In step S203, the block selector 3d obtains the DCT coefficients $D_{uv}$ (u, v=0, 1, . . . , 7) from a DCT processing and calculates the evaluation value $C_r$ (r=1, 2, . . . , h) defined in the following equation (14). If this value $C_r$ is large, the proportion of the high-frequency components is judged as high.

$$C_r = \sum_{\substack{0 \leq u,v \leq 7 \\ u+v \geq 10}} |D_{uv}| \cdot \frac{1}{D_{yn}} \qquad (14)$$

wherein $D_{yn}$ denotes the dynamic range. This dynamic range $D_{yn}$ is, for example, $D_{yn}=2^8=256$ for an 8-bit gradation representation.

Figure 8:
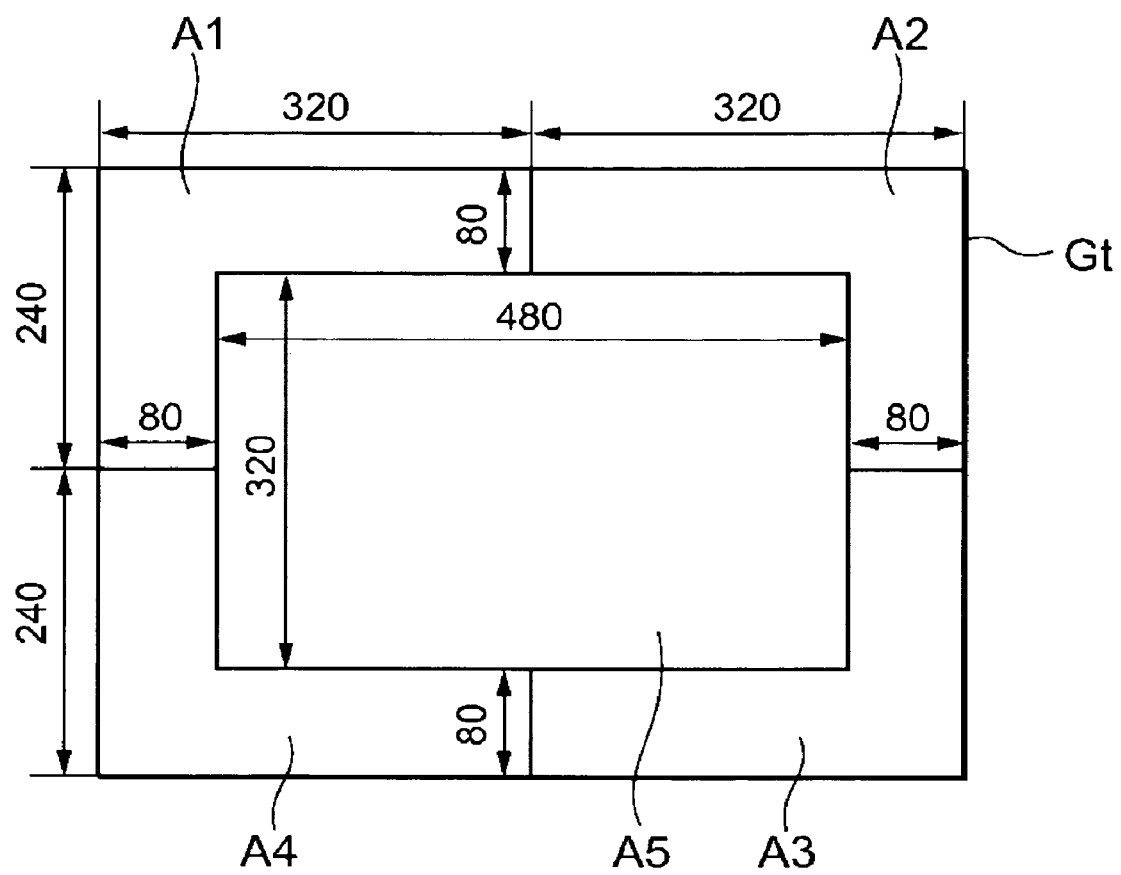
FIG. 8 is a schematic diagram showing another example of pixel areas into which a target image is divided.

As described above, by selecting target pixel blocks Bi with high proportions of high-frequency components, it is possible to select those target pixel blocks Bi having a high processing sensitivity in block matching. Accordingly, it is possible to calculate the motion vectors $V_i$ of thus selected target pixel blocks Bi with high precision, which in turn enables precise calculation of the rotation matrix R(φ) and the shift vector S. It is to be noted that the DCT processing in step S201 does not have to be necessarily performed with respect to all of the divided pixel blocks. For example, when eight blocks are selected in each pixel area As, whose evaluation values $C_r$ are not less than a predetermined value, the processing may be stopped. As an example, as shown in FIG. 8, the target image Gt may be divided into five pixel areas A1 to A5 of the center and four corners so that the target pixel blocks Bi are uniformly selected from the target image Gt. It is to be noted that numerical values indicating sizes of the respective pixel areas A1 to A5 shown in FIG. 8 are merely examples in which the pixel areas A1 to A5 are set to the target image Gt having the resolution of VGA. The sizes of the respective pixel areas A1 to A5 are not limited to this example.

Next, there will be described a modification of the weight setting of the step S111. In the above-described weight setting, the weighting factor $w_i$ of each target pixel block Bi was set in response to the pixel area As to which the respective target pixel blocks Bi belongs to. Instead however, the weighting factor $w_i$ may be selected in accordance with the size of the motion vector $V_i$ of each target pixel block Bi. In this case, the weighting unit 3f may obtain the weighting factor $w_i$ of each target pixel block Bi, for example, by setting $w_i = V_i \cdot V_i = |V_i|^2$. Such weight setting is used to judge the confidence level of the motion vector $V_i$ with respect to the image blur to be high, when the motion vector $V_i$ is large. Such a processing is effective for the blur corrrection of a target image Gt obtained by photographing an object showing fine movements such as swaying tree leaves. In this example, the weighting factors $w_i$ of target pixel blocks Bi with small motion vectors $V_i$ comparable to the movements of the object are set to small values, so that calculation errors attributable to the movement of the object can be reduced.

It is to be noted that the weighting factor $w_i$ may be set, for example, by the following equation (15) in response to both the pixel area As including the respective target pixel block Bi and the size of the motion vector $V_i$ of the respective target pixel block Bi:

$$w_i = w_{area} + (V_i \cdot V_i)/k^2 \quad (15),$$

wherein $w_{area}$ indicates the weighting factor depending on the pixel area As, and k denotes a coefficient to standardize the size of the motion vector $V_i$. The coefficient k indicates a numerical value obtained by presuming a maximum value of the size of the motion vector $V_i$ for each pixel number. For example, in photographing of sport involving a quick movement, since there is a high possibility that the size of the motion vector $V_i$ increases, the coefficient k is set to a large value. To photograph scenery or the like, since there is only a small possibility that the size of the motion vector $V_i$ increases, the value of the coefficient k may be set to be small, and may be appropriately changed depending on the object.

Moreover, as another modification of the weight setting in step S111, a divergence degree di indicating the degree of divergence of motion vectors $V_{ij}$ with respect to the motion vector $V_i$ may be calculated based on the motion vector $V_i$ of the target pixel block Bi and the motion vectors $V_{ij}$ (j=1, 2, ..., m) of each adjacent pixel blocks Bij (j=1, 2, ..., m) disposed adjacent to the target pixel block Bi, and the weighting factor $w_i$ may be set in accordance with the divergence degree $d_i$. Here, the divergence degree $d_i$ is a characteristic value calculated by the following equation (16):

$$d_i = \sum_{j=1}^{m} (V_i^\# \cdot V_{ij})^2 \quad (16)$$

wherein # denotes counterclockwise rotation by 90°, and m denotes the number of adjacent pixel blocks Bij. The divergence degree di calculated by this equation (16) becomes large in case where the divergence of directions of motion vectors $V_{ij}$ with respect to the motion vector $V_i$ is large. Conversely, the divergence degree becomes small when the directions of the motion vectors $V_{ij}$ are aligned to that of $V_i$. Especially, the value of the divergence degree $d_i$ is zero if the direction of the motion vector $V_i$ is the same as that of all motion vectors $V_{ij}$.

In the weight setting processing of weighting factor $w_i$ based upon this divergence degree $d_i$, the weighting unit 3f sets the weighting factor $w_i$ to be large if the divergence degree $d_i$ is small. That is, the weighting unit 3f judges that the confidence level of the motion vector $V_i$ with respect to the image blur is high, if moving directions of the target pixel block Bi and the area in the vicinity of the block are uniform, which implies that the divergence degree $d_i$ is small. By employing such a weight setting processing, it is possible to reduce influences of local calculation errors of motion vectors $V_i$ caused by movements of the photographed object or noise of the image signal. In this way, the rotation matrix R(φ) and the shift vector S can be calculated with high precision to enable accurate correction of image blur.

Figure 9:
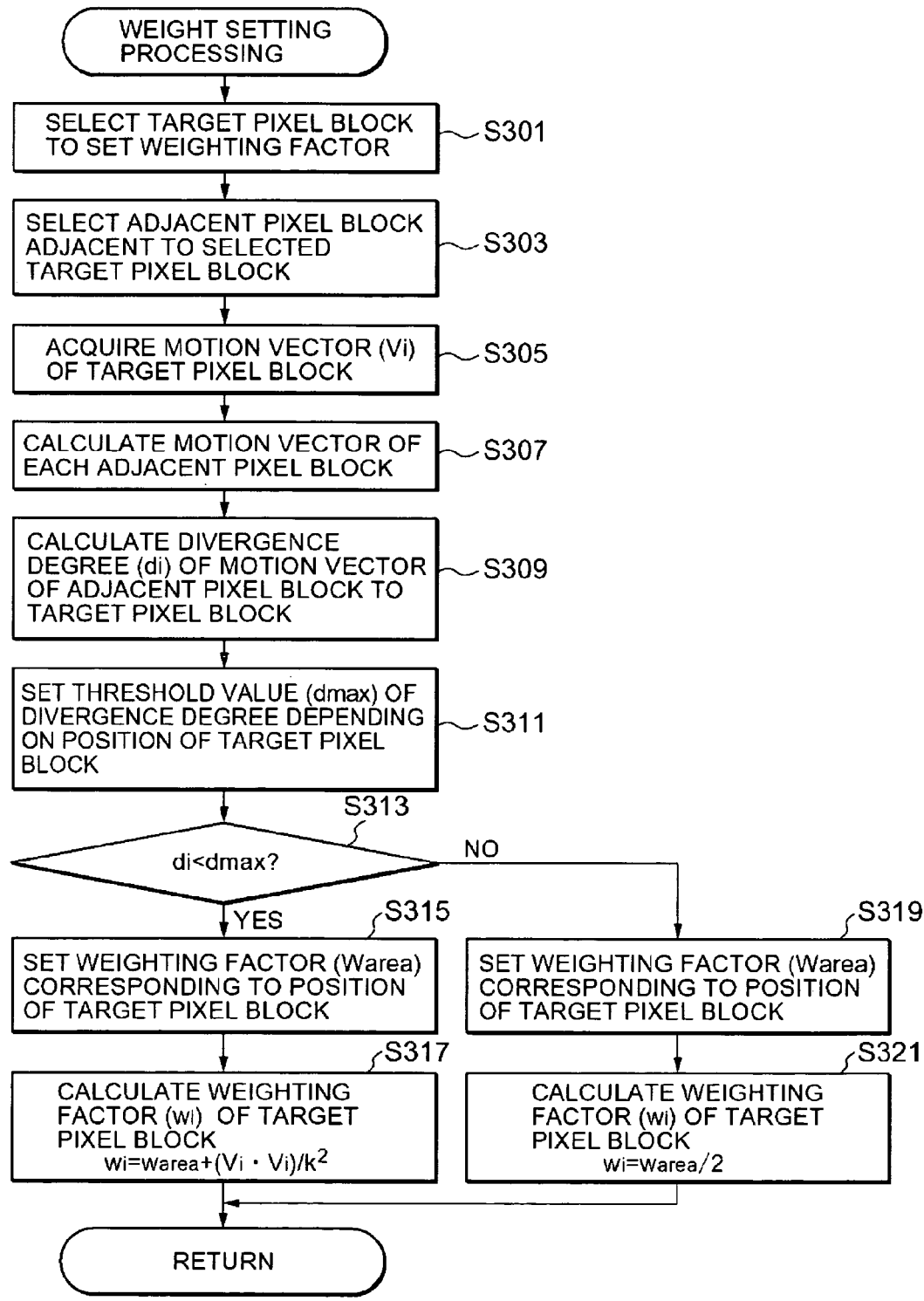
FIG. 9 is a flowchart showing a processing procedure for setting a weight to set a weighting factor in accordance with a divergence degree of a motion vector.

In the following will be described an example of processing steps of the selection process of the weighting factor $w_i$ based on the divergence degree $d_i$. FIG. 9 is a flowchart showing these processing steps as a sub-routine of the weight setting processing in step S111 shown in FIG. 4. As shown in FIG. 9, under the control of the process controller 3a, the weighting unit 3f selects a target pixel block Bi to which the weighting factor $w_i$ is to be selected (step S301), and the adjacent pixel blocks Bij disposed adjacent to the selected target pixel block Bi (step S303). Then, the weighting unit 3f acquires the motion vector $V_i$ of the target pixel block Bi calculated in step S109 (step S305), and calculates the motion vector $V_{ij}$ for each adjacent pixel block Bij (step S307). The weighting unit 3f then calculates the divergence degree $d_i$ of the adjacent pixel blocks Bij with respect to the target pixel block Bi using equation (16) (step S309). Thereafter, the weighting unit 3f sets a threshold value $d_{max}$ for the divergence degree $d_i$ depending on the position of the target pixel block Bi (step S311), and compares the size of the divergence degree $d_i$ with this threshold $d_{max}$ (step S313). If the divergence degree $d_i$ is smaller than the threshold value $d_{max}$ (step S313: Yes), the weighting unit sets a weighting factor $w_{area}$ in response to the position of the target pixel block Bi (step S315) and calculates the weighting factor $w_i$ of block Bi by equation (15) (step S317), and the processing returns to step S111. On the other hand, if the divergence degree $d_i$ is not smaller than the threshold value $d_{max}$ (step S313: No), the weighting unit 3f sets the weighting factor $w_{area}$ in response to the position of the target pixel block Bi (step S319), calculates the weighting factor $w_i$ of the target pixel block Bi by $w_i = w_{area}/2$ (step S321), and returns to step S111.

Figure 10:
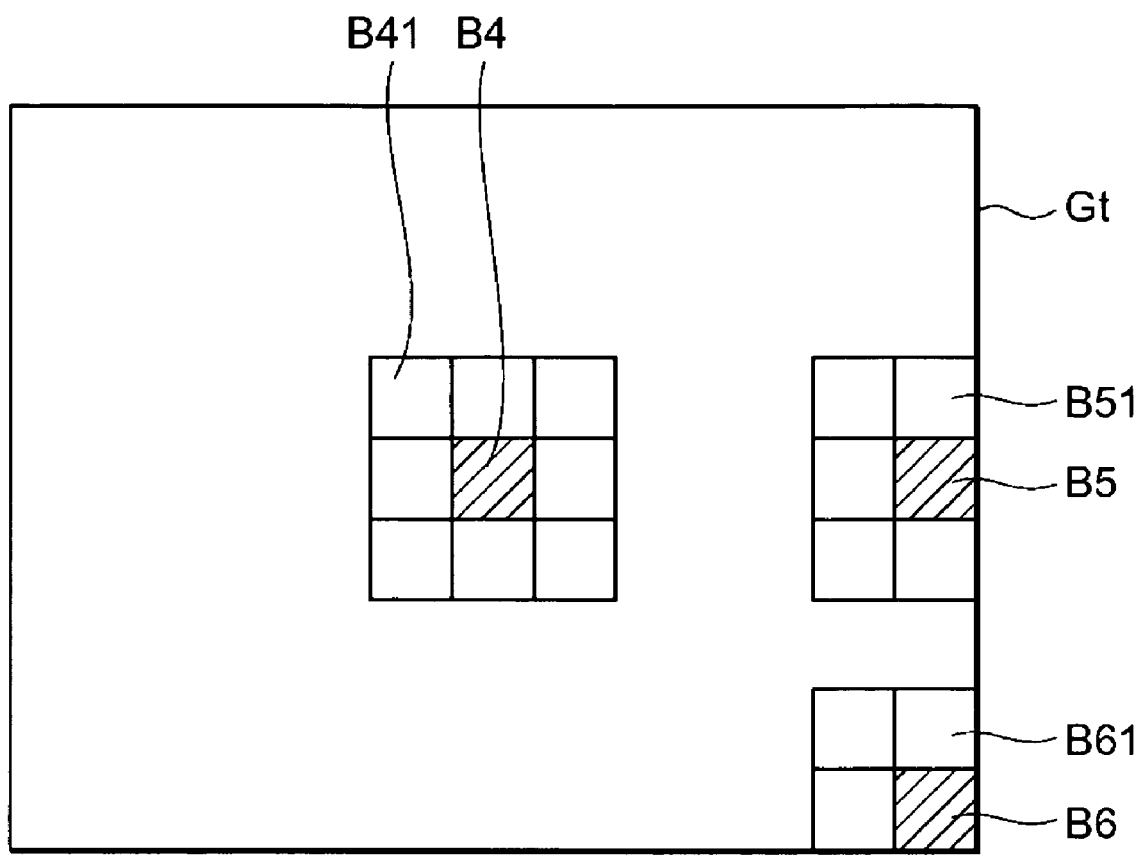
FIG. 10 is a schematic diagram showing an example of selecting an adjacent pixel block adjacent to a target pixel block.

In step S303, the weighting unit 3f selects the adjacent pixel block Bij as shown in FIG. 10. Among the selected target pixel blocks Bi are pixel blocks B4, B5, and B6. For the target pixel block B4, which is not adjacent to an outer peripheral edge of the target image Gt, the weighting unit 3f selects eight surrounding adjacent pixel blocks B41 to B48 each having the size equal to that of the target pixel block B4. As for the target pixel block B5 adjacent to an edge of the target image Gt, the weighting unit 3f selects surrounding five adjacent pixel blocks B51 to B55. In the case of target pixel block B6 positioned at a corner of the target image Gt, the weighting unit 3f selects surrounding three adjacent pixel blocks B61 to B63. It is to be noted that the weighting unit 3f may select as neighboring pixel blocks pixel blocks not adjacent to the target pixel block Bi but those which lie disposed in the vicinity of the pixel block Bij. It is also possible that the process controller 3a allows the block selector 3d to select the adjacent pixel blocks Bij, and the weighting unit 3f may acquire this selection result.

In step S311, the weighting unit 3f sets the threshold value $d_{max}$ depending on the number m of the adjacent pixel blocks Bij selected in step S303, and sets the threshold value $d_{max}$ by, for example, $d_{max}=m\cdot 32^2$. Specifically, $d_{max}=8\cdot 32^2$, $5\cdot 32^2$, $3\cdot 32^2$ are set as the threshold values $d_{max}$ to the target pixel blocks B4, B5, and B6 shown in FIG. 10. The method of setting the threshold value $d_{max}$ is not limited to this example, and the value may be set by other relationships emerging from the number m of the adjacent pixel blocks Bij, or the value may be set without using the number m of the adjacent pixel blocks Bij. The setting conditions of the threshold value $d_{max}$ may be appropriately changed depending on photographing conditions of the target image.

It is to be noted that in step S313, the weighting unit 3f may judge more branching conditions depending on relations between the divergence degree $d_i$ and the threshold value $d_{max}$. The calculations of the weighting factors $w_i$ for use in steps S317 and S321 are not limited to the above-described equations, and another calculation equation may be used. Further in step S307, the process controller 3a may allow the motion vector calculator 3e to calculate the motion vector $V_{ij}$, and the weighting unit 3f may acquire this calculation result.

Moreover, as yet another modification of the weight setting processing shown in step S111, the weighting factor $w_i$ may be set depending on the image contrast $Con_i$ of the target pixel block Bi. Here, the image contrast $Con_i$ can be calculated and evaluated by various methods. For example, the weighting unit 3f may calculate and evaluate the image contrast $Con_i$ by the following equation (17):

$$Con_i = \frac{1}{64} \cdot \sum_{p=1}^{8} \sum_{q=1}^{7} (|f_{q+1,p} - f_{q,p}| + |f_{p,q+1} - f_{p,q}|) \quad (17)$$

Here, the target pixel blocks Bi measure 8×8 pixels, and each pixel data of this target pixel block is denoted by $f_{pq}$ (p, q=1, 2, ..., 8).

Furthermore, the weighting unit 3f may evaluate the image contrast by setting $Con_i=C_r$, where $C_r$ is calculated as shown in equation (14). In this case, the results of the DCT processing performed during general compression coding of the moving image, such as MPEG4 moving image compression, can used in common as DCT coefficients $D_{uv}$, which will promote simplification and speeding-up of the whole processing. A method of using an evaluation value based on the high-frequency components of the DCT coefficients $D_{uv}$ as a measure for the contrast is disclosed in Japanese Patent Application Laid-Open No. 6-303490.

Furthermore, the weighting unit 3f may evaluate the image contrast $Con_i$ of the target image Bi by utilizing the image contrast processed by an auto focus mechanism disposed in a conventional imaging device. Even in this case, the evaluation value can be utilized in common in different processings, and it is possible to promote the simplification and speeding-up of the whole processing.

As described above, in the processing of selecting the weighting factor $w_i$ depending on the image contrast $Con_i$, the weighting unit 3f selects a large weighting factor $w_i$, when the image contrast $Con_i$ of the target pixel block Bi is high. That is, the weighting unit 3f judges the confidence level of the motion vector $V_i$ with respect to the image blur as high, when the image contrast $Con_i$ is high. By use of such weight setting processing, a large weighting factor $w_i$ is selected for those target pixel blocks Bi having high processing sensitivity in block matching processing, which in turn enables a precise calculation of the rotation matrix $R(\phi)$ and the shift vector S and, in this way, an accurate image blur correction.

Figure 11:
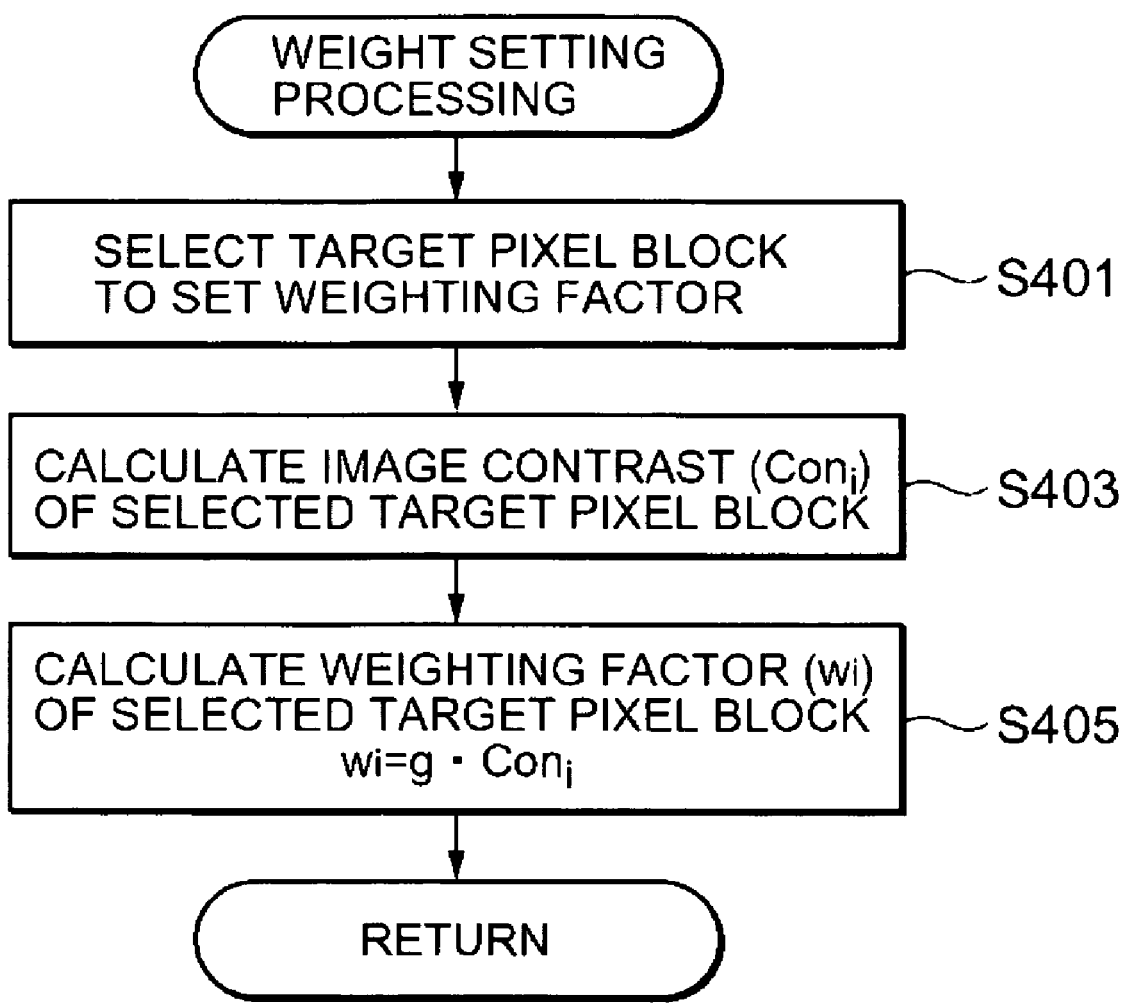
FIG. 11 is a flowchart showing a processing procedure for setting a weight to set a weighting factor in accordance with an image contrast.

An example of the processing steps of the weight setting processing to set the weighting factor $w_i$ depending on the image contrast $Con_i$ will be described. FIG. 11 is a flowchart showing the processing procedure as a sub-routine of the weight setting processing in step S111 shown in FIG. 4. As shown in FIG. 11, under the control of the process controller 3a, the weighting unit 3f selects the target pixel blocks Bi to which respective weighting factors $w_i$ are to be set (step S401). The weighting unit 3f calculates the image contrast values $Con_i$ of the selected target pixel blocks Bi (step S403), calculates the weighting factors $w_i$ by $w_i=g\cdot Con_i$ (step S405), and returns to step S111. Here, the coefficient g may be set to a real number value which is larger than zero, for example, about g=¼. However, the coefficient g is not limited to this example, and may be set based on, for example, various properties of the target pixel blocks Bi, or the coefficient g may be set as a function value.

Moreover, as another modification of the weight setting processing shown in step S111, the confidence level of the motion vector $V_i$ with respect to the image blur is judged depending on the importance of each target pixel block Bi with respect to the calculation precisions of the rotation matrix $R(\phi)$ and the shift vector S, and to set the weighting factor $w_i$ based on this confidence level. In case where the confidence levels of the respective motion vectors $V_i$ for use in calculation are equal, the accuracies of the rotation matrix $R(\phi)$ and the shift vector S enhances if the distance between the respective corresponding target pixel blocks Bi are larger. Therefore, the target pixel blocks Bi having a large interval therebetween are more important with respect to the calculation precision. Thus, by selecting a large weighting factor $w_i$ for the target pixel block Bi having high importance, it becomes possible to calculate the rotation matrix $R(\phi)$ and the shift vector S with high precision and to accurately correct the image blur.

Furthermore, in the weight setting processing shown in step S111, the setting method is not limited to the examples mentioned herein, and various processing methods may be used. The individual setting processing methods may be combined to judge the confidence level of each motion vector $V_i$, and to set the weighting factor $w_i$ accordingly.

According to Embodiment 1 described above, the imaging device 1 selects the target image from a plurality of images, divides the selected target image into pixel areas, selects a plurality of target pixel blocks from the divided pixel areas, and judges the confidence levels of the motion vectors with respect to the image blur based on various characteristics of the selected target pixel blocks. Moreover, the weighting factor of each pixel block is set based on this confidence level, and the motion vector is calculated depending on the confidence level. Therefore, it is possible to calculate the transformation coefficients of the affine transformation corresponding to the blur of the target image with high precision. The target image is affine-transformed based on this calculated transformation coefficients so that the blur of the target image can be accurately corrected. The target pixel block is selected, and the confidence level of the motion vector is judged based on various properties of the target pixel block, such as the position of the target pixel block, the size of the motion vector, the proportion of the high-frequency components, the image contrast, and the motion vector divergence degree related to pixel blocks in the vicinity. Therefore, it is always possible to detect and correct the image blur without fail with high precision in response to various motions or states of the object or the object image.

Next, Embodiment 2 of the present invention will be described. In Embodiment 1 described above, a plurality of target pixel blocks Bi are selected from each pixel area As obtained by dividing the target image, and the transformation coefficients of the affine transformation with respect to the image blur are accurately calculated. On the other hand, in Embodiment 2, two target pixel blocks Bi are selected from four corner areas of a target image, and the transformation coefficients of the affine transformation are easily calculated at high speed.

Figure 12:
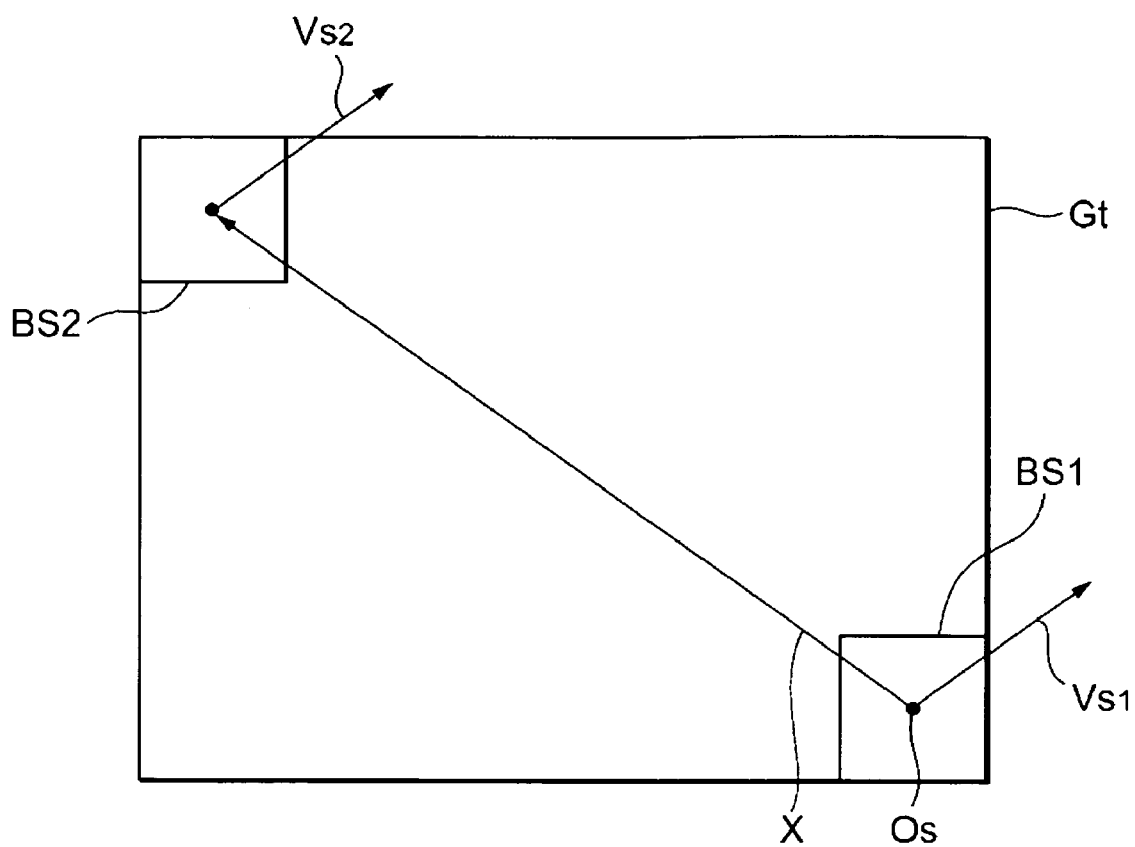
FIG. 12 is a schematic diagram showing an example of a state of selecting two target pixel blocks from corner areas of a target image.

FIG. 12 is a schematic diagram showing one example of a state of selecting two target pixel blocks from the corner areas of the target image. As shown in FIG. 12, in Embodiment 2, target pixel blocks BS1 and BS2 are selected as target pixel blocks Bi, respectively, from lower right and upper left corner areas among four corner areas of the target image Gt. The center point OS of the target pixel block BS1 is selected as the coordinate origin of this target image Gt. The position vector $X_{S2}$ points at the target pixel block BS2, and $V_{S1}$ and $V_{S2}$ denote the motion vectors of the target pixel blocks BS1 and BS2, respectively. Note that the position vector indicating the target pixel block BS1 becomes the zero vector.

Denoting the weighting factors of the target pixel blocks BS1 and BS2 as $w_{S1}$ and $W_{S2}$, respectively, the sum w of the weighting factors is given by $w=w_{S1}+w_{S2}$. The position of the center of gravity $X_c$ is calculated as $X_c=w_{S2}X_{S2}/w$ by means of equation (7). The center-of-gravity motion vector $V_c$ is $V_c=(V_{S1}+w_{S2} \cdot V_{S2})/w$ by means of equation (8). In the weight setting processing, the weighting unit 3f sets sizes of the respective weighting factors $w_{S1}$ and $w_{S2}$ to $w_{S1} \approx w_{S2} \ll 1$, and brings the factors as close as possible to "1" and "0", respectively. In this case, the sum w of the weighting factors is approximated to $w \approx 1$, the center-of-gravity position vector $X_c$ becomes approximately the zero vector, and the center-of-gravity motion vecotr $V_c$ is approximated to $V_c \approx V_{S1}$. Accordingly, the rotational angle $\phi$ of the rotation matrix $R(\phi)$ and the shift vector S are represented by the following equations (18) and (19) using the equations (5) and (6), respectively:

$$S = V_{S1}; \quad (18)$$

and $$\phi = \arctan \frac{-X_{S2} \cdot (-V_{S1} + V_{S2})^{\#}}{X_{S2} \cdot \{X_{S2} - (-V_{S1} + V_{S2})\}} \quad (19)$$

As described above, in Embodiment 2, the target pixel blocks BS1 and BS2 are selected from two corner areas having a diagonal relation therebetween among four corner areas of the target image Gt, the central position of one target pixel block BS1 is selected to be the coordinate origin, and the weighting factors $w_{S1}$ and $w_{S2}$ of the target pixel blocks BS1 and BS2 are brought as close as possible to "1" and "0", respectively. Accordingly, the rotation matrix $R(\phi)$ and the shift vector S can be calculated by use of simpler calculation equations as compared with Embodiment 1. As a result, it is possible to perform calculation processing at a higher speed. Such high-speed blur correction processing is effective for a case where the blur must be continuously corrected in real time, such as when moving image being photographed is observed by the display monitor 5a shown in FIG. 2.

It is to be noted that in the weight setting processing of Embodiment 2, the weighting unit 3f lays importance on the target pixel block BS1 selected to be the coordinate origin and processes the calculations with high priority. As a consequence, the confidence level of the motion vector $V_{S1}$ is judged to be high and, as a result, the respective weighting factors $w_{S1}$ and $w_{S2}$ are brought as close as possible to "1" and "0".

Although the target pixel blocks BS1 and BS2 shown in FIG. 12 are selected from the lower right and upper left corner areas which are diagonal positions in the target image Gt, the method of selecting the target pixel block Bi is not limited to this example, and each target pixel block Bi may be selected from arbitrary two corner areas among the four corner areas in the target image Gt. That is, the selected two target pixel blocks Bi do not have to be necessarily in the diagonal positions, and may be arranged in a lateral or longitudinal direction in the target image Gt.

We note that, although in the above Embodiments 1 and 2 the blur of the images, which have been picked up by the imaging device 1, is corrected, it is also possible to do the blur correction of an image input from the outside or an image stored in the storage unit 8. The blur correction method of the present invention may be also applied to an image processing device such as a computer, which is different from the imaging device 1, to correct the blur of the image input from the outside to such an image processing device. It is also possible to apply the image blur correction in the imaging device 1 when displaying the image on the display monitor 5a, but not to apply when the image is output to the outside via the portable recording medium 9 or the communication unit 7. In this particular case, the blur correction processing may be performed in the image processing device as an external device to which the image has been output. In this case, processing loads in the image processor 3 are reduced, and the processing can be speeded up.

Furthermore, as to various blur correction processing in Embodiments 1 and 2 described above, a processing may be selected and switched as needed based on some selection information of the blur correction processing mode input via the input unit 4 or the like.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A blur correction method comprising causing a processor to perform the steps of:
   selecting a first image and a second image;
   selecting at least two blocks from the first image;
   calculating position vectors related to positions of the blocks and motion vectors indicative of relative motions of the blocks between the first and the second images;

selecting weight coefficients for the blocks based on degrees of confidence of the motion vectors with respect to the blur;

calculating coefficients of an affine transformation from the position vectors, the motion vectors, and the weight coefficients; and subjecting the first image to the affine transformation to correct the blur, wherein the affine transformation comprises a rotation, of which a rotational angle can be expressed as a combination of at least the following expressions:

1) the weight coefficients;
2) a relative position vector as a difference of one of the position vectors with a center-of-gravity position vector; and
3) a relative motion vector as a difference of one of the motion vectors with a center-of-gravity motion vector, wherein the center-of-gravity position vector is indicative of a weighted center of gravity of the position vectors weighted in relation with the weight coefficients, wherein the center-of-gravity motion vector is indicative of a weighted center of gravity of the motion vectors weighted in relation with the weight coefficients;

rotating the first image around a position indicated by the center-of-gravity position vector by an amount given by the rotational angle; and shifting the first image by a shifting vector amount derived from the center-of-gravity motion vector, wherein the selected blocks comprise a first block and a second block both of which are taken from two different peripheral areas of the first image, characterized in that:

1) the center-of-gravity position vector points at the first block;
2) the weight coefficient of the second block is selected to be significantly smaller than that of the first block; and
3) the relative motion vector is given by a difference of the motion vectors of the first and the second blocks.

2. An image device comprising:

an optical system and an imaging unit which form image data corresponding to an object;

an image selection unit which selects a first image and a second image;

a block selection unit which selects at least two blocks from the first image;

a vector calculation unit which calculates motion vectors indicative of relative motions of the blocks between the first and the second images;

a weight factor calculator which selects weight coefficients for the blocks, the weight coefficients being indicative of confidence levels of motion vectors with respect to a blur between the first image and the second image;

a coefficient calculation unit which calculates coefficients of an affine transformation based upon position vectors related to positions of the blocks, the motion vectors, and the weight coefficients; and a blur correction unit which applies the affine transformation to correct the blur between the first and the second images, wherein the affine transformation comprises a rotation, of which rotational angle can be expressed as a combination of at least following expressions:

1) the weight coefficients;
2) a relative position vector as a difference of one of the position vectors with a center-of-gravity position vector; and
3) a relative motion vector as a difference of one of the motion vectors with a center-of-gravity motion vector, wherein the center-of-gravity position vector is indicative of a weighted center of gravity of the position vectors weighted in relation with the weight coefficients, wherein the center-of-gravity motion vector is indicative of a weighted center of gravity of the motion vectors weighted in relation with the weight coefficients, wherein the blur correction unit rotates the first image around a position indicated by the center-of-gravity position vector by an amount given by the rotational angle; and shifts the first image by a shifting vector amount derived from the center-of-gravity motion vector, and wherein the block selection unit selects a first block and a second block from two different peripheral areas of the first image, the imaging device further characterized in that:

1) the center-of-gravity position vector points at the first block;
2) the weight coefficient of the second block is selected to be significantly smaller than that of the first block; and
3) the relative motion vector is given by a difference of the motion vectors of the first and the second blocks.

3. A blur correction method for correcting blur between a first image and a second image, the method comprising causing a processor to perform the steps of:

selecting a first block and a second block from the first image, the first block having a first motion vector and the second block having a second position vector relative to the first block and having a second motion vector, the first and second motion vectors being indicative of relative motions of the first and second blocks between the first and the second images; and calculating a shift vector and a rotational angle as coefficients of an affine transformation for correcting the blur from the first and second motion vectors and the second position vector, wherein the shift vector is calculated based upon the first motion vector and no other motion vectors, and wherein the rotational angle is calculated based upon the following expressions only and no other motion vectors or position vectors:

1) the second position vector;
2) difference vector between the first and the second motion vectors; and
3) a vertical vector vertical to said difference.

4. The method of claim 3, wherein the rotational angle is calculated based upon a fractional expression comprising a numerator and a denominator, wherein the numerator is calculated from a product between the second position vector and the vertical vector, and wherein the denominator is calculated from a product between the second position vector and an expression wherein the second position vector is added to or subtracted from the difference vector.

5. The method of claim 4, wherein the shift vector S is given by $S=V_{S1}$, and wherein the rotational angle $\phi$ is given by $$\phi = \arctan\frac{-X_{S2} \cdot (-V_{S1} + V_{S2})^{\#}}{X_{S2} \cdot \{X_{S2} - (-V_{S1} + V_{S2})\}}$$

wherein $X_{S2}$ is the second position vector, $V_{S1}$ is the first motion vector, and $V_{S2}$ is the second motion vector.

6. The method of claim 3, wherein the first and the second blocks are taken from a peripheral area within the first image.

7. The method of claim 3, wherein the first and the second images are images within a movie, and wherein the blur is corrected continuously and in real time.

8. A blur correction method for correcting a blur between a first image and a second image, said method comprising causing a processor to perform the steps of:

selecting at least two blocks from the first image;

determining for each block its position vector, motion vector indicative of relative motion of the block between the first and the second images, and a weight coefficient;

calculating coefficients of an affine transformation for correcting the blur using mathematical expressions derived from the position vectors, the motion vectors, and the weight coefficients, wherein the weight coefficients add up to 1 (one);

wherein limits of the expressions are calculated when a first weight coefficient is brought closely to 1 (one) and a second weight coefficient is brought closely to 0 (zero), and wherein the blur is corrected using an affine transformation based upon these limits.

* * * * *